(12) United States Patent
Carcelli et al.

(10) Patent No.: US 7,705,072 B2
(45) Date of Patent: Apr. 27, 2010

(54) FLEXIBLE CONCRETE WATERPROOFER

(75) Inventors: Robert E. Carcelli, Mayfield Heights, OH (US); Matthew J. Eschenauer, Vermilion, OH (US)

(73) Assignee: The Sherwin-Williams Company, Cleveland, OH (US)

( * ) Notice: Subject to any disclaimer, the term of this patent is extended or adjusted under 35 U.S.C. 154(b) by 296 days.

(21) Appl. No.: 11/962,452

(22) Filed: Dec. 21, 2007

(65) Prior Publication Data
US 2008/0166486 A1 Jul. 10, 2008

Related U.S. Application Data

(60) Provisional application No. 60/871,650, filed on Dec. 22, 2006.

(51) Int. Cl.
*C08K 7/00* (2006.01)

(52) U.S. Cl. ............... 523/220; 524/261; 524/442; 524/492; 524/493

(58) Field of Classification Search ........... 523/220; 524/261, 442, 494
See application file for complete search history.

(56) References Cited

U.S. PATENT DOCUMENTS 4,021,401 A * 5/1977 Jeppsen .............. 523/131

* cited by examiner

*Primary Examiner*—Edward J Cain
(74) *Attorney, Agent, or Firm*—Vivien Y. Tsang; Robert E. McDonald; Deron A. Cook

(57) ABSTRACT

A moisture resistant concrete coating composition comprising 20% to 30% by weight, based on the weight of the coating composition, of a water dispersible resin having a non-volatile materials content in the range of 40% to about 60%, an average particle size in the range of 80 nm to 400 nm, and a glass transition temperature in the range of −10° C. to 40° C.; 0.1% to 0.50% by weight of an alkoxysilane; 3.0% to 15% by weight of a mineral aggregate; and 25% to 55% by weight of an extender composition.

19 Claims, No Drawings

FLEXIBLE CONCRETE WATERPROOFER

CROSS-REFERENCE TO RELATED APPLICATION

This application claims the benefit of U.S. provisional patent application No. 60/871,650 filed on Dec. 22, 2006, the entirety of which is hereby incorporated by reference.

This invention relates to an aqueous coating composition capable of forming a highly durable coating with excellent water resistance and flexibility. This invention is directed to a one-pack aqueous coating composition capable of producing a coating with excellent flexibility and elongation for repair of cracks in concrete, and for strengthening concrete structures. The coating composition of this invention has excellent water resistance for waterproofing above grade concrete balconies and walkways. The coating composition of this invention can also withstand continuous water submersion, pedestrian traffic, and is tintable, breathable and can be applied by spray, roller, brush and notch squeegee.

Typical commercially available concrete waterproofing compositions are two- or multi-part systems that include multiple layers of cement, fiberglass or metal mesh. These multi-part waterproofing compositions are laborious and time consuming. This invention is directed to a one-pack moisture resistant flexible coating composition that can be applied to masonry structures for waterproofing, repairing and protecting concrete or masonry structures. The invention is particularly useful for waterproofing concrete or masonry structures that are less flexible than the coating itself; that is, if the coating that is applied to a surface is more flexible and elastic than the surface being coated, the movement of that surface after application of the coating will not cause cracks in the coating. Thus, the coating will remain an effective water barrier. The coating composition can be utilized in repairing deteriorated concrete surfaces, as well as be utilized for decorative and waterproofing purposes.

The coating composition of this invention comprises 20% to 30% by weight, based on the weight of the coating composition, of a water dispersible resin having a non-volatile materials content in the range of 40% to about 60%, an average particle size in the range of 80 nm to 400 nm, and a glass transition temperature in the range of $-10°$ C. to $40°$ C.; 0.1% to 0.50% by weight, based on the total weight of the coating composition, of an alkoxysilane; 3.0% to 15% by weight, based on the total weight of the coating composition, of a mineral aggregate; and 25% to 55% by weight, based on the total weight of the coating composition, of an extender composition, said extender composition comprising 4.0% to 8.0% by weight, based on the total weight of the extender, of at least one silica, wherein at least one silica has an average particle size in the range of 1 micron to 15 microns; 7.0% to 12.0% by weight, based on the total weight of the extender, of a silicate, wherein the silicate has an average particle size in the range of 1 micron to 40 microns; and 10% to 20% by weight, based on the total weight of the extender, of a second silica, wherein the second silica has an average particle size in the range of 1 micron to 110 microns. In one embodiment of this invention, the coating composition has a non-volatile materials content in the range of 65% to 75%.

The water dispersible resin emulsion used in the invention can be an acrylic resin emulsion such as a styrene acrylic resin, a urethane styrene acrylic resin, an epoxy acrylic, and alkyd acrylic resin, an all acrylic resin, or a hybrid of these acrylic resins, having an average particle diameter in the range of 80 nm to 400 nm, and a glass transition temperature in the range of $-10°$ C. to $40°$ C.

The alkoxysilane of this invention can be a C1-C20-alkyl-C1-C6 alkoxysilanes. Examples of C1-C6-alkoxy radicals are the methoxy, ethoxy, n-propoxy, isopropoxy, n-butoxy, isobutoxy, sec-butoxy, tert-butoxy radicals; pentyloxy radicals, such as the n-pentyloxy radical, and hexyloxy radicals, such as the n-hexyloxy radical. In one embodiment of this invention, the alkoxysilane has a nonvolatile materials content in the range of 45 to 55%.

Examples of the C1-C20-alkyl radicals are the methyl, ethyl, n-propyl, isopropyl, n-butyl, isobutyl, tert-butyl, n-pentyl, isopentyl, neopentyl, tert-pentyl radical; hexyl radicals, such as the n-hexyl radical; heptyl radicals, such as the n-heptyl radical; octyl radicals, such as the n-octyl radical and iso-octyl radicals, such as the 2,2,4-trimethylpentyl radical; nonyl radicals, such as the n-nonyl radical; decyl radicals, such as the n-decyl radical, and dodecyl radicals, such as the n-dodecyl radical; cycloalkyl radicals, such as cyclopentyl, cyclohexyl, 4-ethylcyclohexyl, cycloheptyl radicals, norbornyl radicals and methylcyclohexyl radicals.

The mineral aggregate of this invention comprises between 7% and 15% by weight silica, based on the total weight of the mineral aggregate, having a mesh size of 40 or less, and between 10% to 90% by weight silica, based on the total weight of the mineral aggregate, having a mesh size of 40 to 270, and less than 1% by weight of silica having a mesh size of 270 or more.

The extender composition of this invention comprises a combination of silicas having differing particle sizes and at least one silicate material. The type of silicate material can any metal silicate, such as aluminum silicate, calcium silicate, magnesium silicate, sodium silicate, potassium silicate, sodium aluminum silicate, sodium magnesium silicate, and the like, or mixtures thereof. The amount of silicate present in the extender composition is about 7% to about 12% by weight, based on the total weight of the extender composition.

The water dispersible acrylic resin emulsion, alkoxysilane, mineral aggregate and extender can be combined together during the course of preparation of a coating composition. The components are present at 20% to 30% water dispersible resin, 0.1% to 0.50% by weight of the alkoxysilane, 3.0% to 15% by weight of the mineral aggregate, and 25% to 55% by weight, of an extender all based on the total weight of the coating composition. In one embodiment, the ratio of the particle size distribution of the mineral aggregate as described above provides for good dispersibility, permeability, and hardening of the composition. In accordance with this invention, the resin of the coating composition has an elongation in the range of about 10% to about 50%, and water vapor permeability in the range of 5 to 15 perms (grains/hr ft$^2$ in Hg).

The coating composition may further comprise a pigment or pigment extender. A non-limiting list of useful pigments and/or pigment extenders for this invention include titanium dioxide, yellow oxide, red oxide, and the like. The extender can be a surface-modified pigment extender or an organic-modified pigment extender. The pigment and extender may be present at about 25% to 50%, based on the total weight of solids in the coating composition.

The coating composition can be applied to a substrate as a one-component system by spraying, brushing, rolling, texturing, by squeegee, backrolling, etc. The coating composition is typically applied at a wet film thickness of at least 0.35 microns. After application, the coating can dry rapidly under normal ambient conditions.

This invention is also directed to an article comprising a moisture-resistant coating composition, wherein said moisture resistant coating composition comprises 20% to 30% by weight, based on the weight of the coating composition, of a water dispersible resin having a non-volatile materials content in the range of 40% to about 60%, an average particle size in the range of 80 nm to 400 nm, and a glass transition temperature in the range of −10° C. to 40° C.; 0.1% to 0.50% by weight, based on the total weight of the coating composition, of an alkoxysilane; 3.0% to 15% by weight, based on the total weight of the coating composition, of a mineral aggregate, said mineral aggregate comprising between 7% and 15% by weight silica, based on the total weight of the mineral aggregate, having a mesh size of 40 or less, and between 10% to 90% by weight silica, based on the total weight of the mineral aggregate, having a mesh size of 40 to 270, and less than 1% by weight of silica having a mesh size of 270 or more; and 25% to 55% by weight, based on the total weight of the coating composition, of an extender composition, said extender composition comprising 4.0% to 8.0% by weight, based on the total weight of the extender, of at least one silica, wherein at least one silica has an average particle size in the range of 1 micron to 15 microns; 7.0% to 12.0% by weight, based on the total weight of the extender, of a silicate, wherein the silicate has an average particle size in the range of 1 micron to 40 microns; and 10% to 20% by weight, based on the total weight of the extender, of a second silica, wherein the second silica has an average particle size in the range of 1 micron to 110 microns.

The coating composition of this invention can be applied by common methods known in the art, such as by brush, roller, notch squeegee, roll applicator and texture sprayer. The coating can also be topcoated with decorative coatings, sealers or masonry topcoats.

Physical Properties of Coating Compositions

The table below provides test results of the coating composition of this invention.

| Property | Test Method | Test Criteria | Test Results |
| --- | --- | --- | --- |
| Working Time | | | 30-90 minutes |
| Adhesion to Concrete | ASTM C-297 (Modified) | 7 days | 175 psi/1.2 Mpa |
| Tensile Strength | ASTM D-412 | Without mesh | 175 psi/3.2 Mpa |
| | | With mesh | 797 psi/26.7 Mpa |
| Elongation | ASTM D-412 | Without mesh | 62% |
| | | With mesh | 3.4% |
| Flexibility Mandrel Bend | ASTM D-522 | 28 days | Passes ⅛" @ 77 F. |
| Abrasion Resistance (grams per weight loss) | ASTM D-4060 Taber CS-10 wheel | 3000 cycles | 0.20 |
| | | 6000 cycles | 0.34 |
| Water Absorption | ASTM D-570 | 24 hour immersion | 15% |
| Waterproofing (hydrostatic pressure) | | Untreated CMU | 1.45 psi/0.01 Mpa |
| | | Waterprooof coat | >101.5 psi/0.70 MPa |
| Vapor Permeability | ASTM E-96 Procedure B | | 10.5 U.S. perms |
| Chloride Ion Penetration | Modified MCHRP Report 244 Phase I | | 89.9% Reduction |
| Rapid Chloride Permeability | ASTM C 1202 Report 244 Phase I | Untreated Concrete | 2500 coulombs (moderate) |
| | | Waterproof coat over concrete. | 550 coulombs (very low) |

The table below provides comparison data of commercially available coating concrete repair/waterproofing compositions and the coating composition of this invention as applied to a concrete substrate at 28 mils wet film thickness.

| | 1-part Coating Composition of this Invention | 2-part Commercially Available Waterproofer |
| --- | --- | --- |
| Water Vapor Perms (grains/(hr*ft$^2$-in Hg) | 10.5 | 8.2 |
| Water Absorption | 15% | 10% |
| Elongation | 62% | 3.4% |
| Tensile Strength | 175 psi | 167 psi |

What is claimed is:

1. A moisture resistant concrete coating composition comprising:

20% to 30% by weight, based on the weight of the coating composition, of a water dispersible resin having a non-volatile materials content in the range of 40% to about 60%, an average particle size in the range of 80 nm to 400 nm, and a glass transition temperature in the range of −10° C. to 40° C.;

0.1% to 0.50% by weight, based on the total weight of the coating composition, of an alkoxysilane;

3.0% to 15% by weight, based on the total weight of the coating composition, of a mineral aggregate, said mineral aggregate comprising:

between 7% and 15% by weight silica, based on the total weight of the mineral aggregate, having a mesh size of 40 or less, and between 10% to 90% by weight silica, based on the total weight of the mineral aggregate, having a mesh size of 40 to 270, and less than 1% by weight of silica having a mesh size of 270 or more; and 25% to 55% by weight, based on the total weight of the coating composition, of an extender composition, said extender composition comprising:

4.0% to 8.0% by weight, based on the total weight of the extender, of at least one silica, wherein at least one silica has an average particle size in the range of 1 micron to 15 microns;

7.0% to 12.0% by weight, based on the total weight of the extender, of a silicate, wherein the silicate has an average particle size in the range of 1 micron to 40 microns; and 10% to 20% by weight, based on the total weight of the extender, of a second silica, wherein the second silica has an average particle size in the range of 1 micron to 110 microns.

2. The coating composition of claim 1, wherein the water dispersible resin has an elongation in the range of about 10% to about 50%.

3. The coating composition of claim 1, wherein the water dispersible resin is selected from the group consisting of acrylic resin, styrene acrylic resin, urethane styrene acrylic resin, epoxy acrylic resin, alkyd acrylic resin, and hybrid emulsion resin.

4. The coating composition of claim 1, wherein the alkoxysilane has a nonvolatile materials content in the range of 45 to 55%.

5. The coating composition of claim 1, wherein the silicate is a metal silicate.

6. The coating composition of claim 1, wherein the silicate is selected from the group consisting of aluminum silicate, calcium silicate, magnesium silicate, sodium silicate, potassium silicate, sodium aluminum silicate, sodium magnesium silicate, and the like, or mixtures thereof.

7. The coating composition of claim 1, wherein the water dispersible resin has a water vapor permeability in the range of 5 to 15 perms.

8. The coating composition of claim 1, wherein the coating composition has a non-volatile materials content in the range of 65% to 75%.

9. The coating composition of claim 1, further comprising a pigment.

10. The coating composition of claim 1, wherein the coating composition can be applied as a one-pack system.

11. The coating composition of claim 1, wherein the extender is a surface-modified pigment extender or an organic-modified pigment extender.

12. The coating composition of claim 1, wherein the coating composition can be applied with spray, brush, texture sprayer, and squeegee.

13. An article comprising a moisture-resistant coating composition, wherein said moisture resistant coating composition comprises:

20% to 30% by weight, based on the weight of the coating composition, of a water dispersible resin having a non-volatile materials content in the range of 40% to about 60%, an average particle size in the range of 80 nm to 400 nm, and a glass transition temperature in the range of −10° C. to 40° C.;

0.1% to 0.50% by weight, based on the total weight of the coating composition, of an alkoxysilane;

3.0% to 15% by weight, based on the total weight of the coating composition, of a mineral aggregate, said mineral aggregate comprising:

between 7% and 15% by weight silica, based on the total weight of the mineral aggregate, having a mesh size of 40 or less, and between 10% to 90% by weight silica, based on the total weight of the mineral aggregate, having a mesh size of 40 to 270, and less than 1% by weight of silica having a mesh size of 270 or more; and 25% to 55% by weight, based on the total weight of the coating composition, of an extender, said extender comprising 4.0% to 8.0% by weight, based on the total weight of the extender, of at least one silica, wherein at least one silica has an average particle size in the range of 1 micron to 15 microns;

7.0% to 12.0% by weight, based on the total weight of the extender, of a silicate, wherein the silicate has an average particle size in the range of 1 micron to 40 microns; and 10% to 20% by weight, based on the total weight of the extender, of a second silica, wherein the second silica has an average particle size in the range of 1 micron to 110 microns;

and wherein the coating composition has a non-volatile materials content in the range of 55% to 75%.

14. The article of claim 13, wherein the silicate is a metal silicate.

15. The article of claim 13, wherein the silicate is selected from the group consisting of aluminum silicate, calcium silicate, magnesium silicate, sodium silicate, potassium silicate, sodium aluminum silicate, sodium magnesium silicate, and the like, or mixtures thereof.

16. A method of waterproofing a concrete structure, comprising:

a) applying to a surface of the structure a coating composition comprising:

20% to 30% by weight, based on the weight of the coating composition, of a water dispersible resin having a non-volatile materials content in the range of 40% to about 60%, an average particle size in the range of 80 nm to 400 nm, and a glass transition temperature in the range of −10° C. to 40° C.; 0.1% to 0.50% by weight, based on the total weight of the coating composition, of an alkoxysilane;

3.0% to 15% by weight, based on the total weight of the coating composition, of a mineral aggregate, said mineral aggregate comprising:

between 7% and 15% by weight silica, based on the total weight of the mineral aggregate, having a mesh size of 40 or less, and between 10% to 90% by weight silica, based on the total weight of the mineral aggregate, having a mesh size of 40 to 270, and less than 1% by weight of silica having a mesh size of 270 or more; and 25% to 55% by weight, based on the total weight of the coating composition, of an extender, said extender comprising 4.0% to 8.0% by weight, based on the total weight of the extender, of at least one silica, wherein at least one silica has an average particle size in the range of 1 micron to 15 microns; 7.0% to 12.0% by weight, based on the total weight of the extender, of a silicate, wherein the silicate has an average particle size in the range of 1 micron to 40 microns; and 10% to 20% by weight, based on the total weight of the extender, of a second silica, wherein the second silica has an average particle size in the range of 1 micron to 110 microns;

(b) drying the coating composition under ambient conditions on the structure to form a continuous film.

17. The method of claim 16, wherein the coating on the structure has an average water vapor permeability of less than about 5 to 15 perms.

18. The method of claim 16, wherein the coating composition has a non-volatile materials content in the range of 55% to 75%.

19. The method of claim 16, wherein the coating composition further comprises a pigment.

* * * * *